(12) United States Patent
Baughman et al.

(10) Patent No.: US 11,455,540 B2
(45) Date of Patent: Sep. 27, 2022

(54) AUTONOMIC HORIZONTAL EXPLORATION IN NEURAL NETWORKS TRANSFER LEARNING

(71) Applicant: International Business Machines Corporation, Armonk, NY (US)

(72) Inventors: Aaron K. Baughman, Cary, NC (US); Michael Behrendt, Sindelfingen-Maichingen (DE); Shikhar Kwatra, Durham, NC (US); Craig M. Trim, Ventura, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 539 days.

(21) Appl. No.: 16/684,973

(22) Filed: Nov. 15, 2019

(65) Prior Publication Data

US 2021/0150360 A1    May 20, 2021

(51) Int. Cl.
*G06N 3/08*      (2006.01)
*G06N 3/04*      (2006.01)
(Continued)

(52) U.S. Cl.
CPC ............. *G06N 3/082* (2013.01); *G06F 17/16* (2013.01); *G06K 9/6215* (2013.01); *G06N 3/0454* (2013.01); *G06N 5/02* (2013.01)

(58) Field of Classification Search
CPC ........ G06N 3/082; G06N 3/0454; G06N 5/02; G06F 17/16; G06K 9/6215
See application file for complete search history.

(56) References Cited

U.S. PATENT DOCUMENTS 9,015,093 B1 *   4/2015   Commons ............. B60W 30/00
                                                      706/26
9,508,347 B2 *  11/2016   Wang ....................... G06N 3/02
(Continued)

FOREIGN PATENT DOCUMENTS

CN        106709349 A     12/2016
CN        108062369 A     12/2017
(Continued)

OTHER PUBLICATIONS

Pratama, Mahardhika, and Dianhui Wang. "Deep stacked stochastic configuration networks for lifelong learning of non-stationary data streams." Information Sciences 495 (2019): 150-174. (Year: 2019).*

(Continued)

*Primary Examiner* — Fayyaz Alam
(74) *Attorney, Agent, or Firm* — Garg Law Firm, PLLC; Rakesh Garg; Christopher Pignato

(57) ABSTRACT

An autonomic function is caused to execute in an artificial intelligence environment to detect a new problem space. Using the autonomic function, a first model is selected. The first model includes a first trained neural network corresponding to a first ontology. A second model is automatically identified. the second model includes a second trained neural network corresponding to a second ontology. A layer is autonomically extracted from the second model and inserted into a location in the first model. A vector transformation is automatically constructed to transform an output vector of a previous layer in an immediately previous location in the model relative to the location. The layer is automatically fused in the first model using the transformed output vector as input to the layer, the fusing forming a fused model that is operable on an ontology of the new problem space.

20 Claims, 8 Drawing Sheets

(51) Int. Cl.
G06F 17/16 (2006.01)
G06K 9/62 (2022.01)
G06N 5/02 (2006.01)

(56) References Cited

U.S. PATENT DOCUMENTS

| | | | |
|---|---|---|---|
| 2007/0288410 | A1 | 12/2007 | Tomkins et al. |
| 2017/0041341 | A1 | 2/2017 | Wang et al. |
| 2017/0200066 | A1* | 7/2017 | Wang .................. G06K 9/6269 |
| 2020/0334520 | A1* | 10/2020 | Chen ..................... G06N 3/088 |
| 2022/0122692 | A1* | 4/2022 | Feala ..................... G06N 3/088 |

FOREIGN PATENT DOCUMENTS

| | | |
|---|---|---|
| EP | 0897566 B1 | 8/2003 |
| EP | 3035249 A1 | 6/2016 |

OTHER PUBLICATIONS

Looks et al., Deep Learning with Dynamic Computation Graphs, ICLR 2017.
Ndibanje et al., Cross-Method-Based Analysis and Classification of Malicious Behavior by API Calls Extraction, Appl. Sci. 2019, 9, 239, Jan. 2019.
ip.com, Method and Apparatus for Improving Network Performance Using Cognitive Framework, Mar. 1, 2019, IP.com No. IPCOM000257674D.
ip.com, Methods for Deep Learning Network Compression for Resource-Constrained Devices, Jun. 21, 2016, IP.com No. IPCOM000246620D.
ip.com, Machine Learning Algorithms for Smart Meter Diagnostics, Jul. 16, 2015, IP.com No. IPCOM000242462D.
Graf et al., Computational Intelligence for Efficient Numerical Design of Structures with Uncertain Parameters, 2015 IEEE Symposium Series on Computational Intelligence.
Liu et al., A Self Fixing Intelligent Ant Clustering Algorithm For Graphs, 2018 International Joint Conference on Neural Networks (IJCNN).
Konigsmark et al., PolyPUF: Physically Secure Self-Divergence, IEEE Transactions on Computer-Aided Design of Integrated Circuits and Systems, vol. 35, Issue: 7, Jul. 2016, Oct. 7, 2015.
Van Noort et al., Ad-hoc polymorphism and dynamic typing in a statically typed functional language, WGP '10 Proceedings of the 6th ACM SIGPLAN workshop on Generic programming, pp. 73-84, 2010.
Gesbert et al., Parametric polymorphism and semantic subtyping: the logical connection, ICFP '11 Proceedings of the 16th ACM SIGPLAN international conference on Functional programming, 2011.
Eisenberg et al., Levity polymorphism, PLDI 2017 Proceedings of the 38th ACM SIGPLAN Conference on Programming Language Design and Implementation, pp. 525-539, 2017.
List of all IBM related dockets, Appendix P, 2019.

* cited by examiner

AUTONOMIC HORIZONTAL EXPLORATION IN NEURAL NETWORKS TRANSFER LEARNING

TECHNICAL FIELD

The present invention relates generally to a method, system, and computer program product for training a neural network on new subject matter. More particularly, the present invention relates to a method, system, and computer program product for autonomic horizontal exploration in neural networks transfer learning.

BACKGROUND

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

Generally, in a neural network, a node is connected with one or more other nodes via weighted connections in a layer of the neural network. A layer is connected to another layer in the neural network by coupling one layer's output to another layer's input. An output of a layer is an output vector of that layer. An input to a layer is an input vector to that layer.

A feature is an artifact or value identified as significant in a layer of a neural network. A layer of a neural network produces an output on one or more output channels (channels). A layer in a neural network outputs a feature map. A feature map comprises a set of feature matrices for each channel over a given number of channels. A feature matrix comprises a set of features, which is output as a data matrix. A feature matrix includes biases associated with the corresponding features represented in the matrix. A weight or bias is a value that is associated with a subject value to indicate a significance of the subject value. For example, a relatively lower weighted connection is less important than a relatively higher weighted connection, a feature with a relatively higher bias is more significant than another feature with a relatively lower bias.

A neural network has to be trained before the neural network can be used for a useful purpose. A trained neural network is also referred to herein as a 'model' unless expressly distinguished where used.

A neural network training subjects a neural network to training data of a type and subject-matter in which the trained model will be expected to operate. The training includes adjusting the weights of the internode connections, weighting of inter-layer connections, feature matrix configuration for ingestion at a layer, feature map configuration at the output of a layer, feature weighting or bias in a feature matrix, channel biasing at the input/output of layers, and many other operations.

Training a neural network is computationally expensive. A neural network that is trained with a larger amount of training data can be, but not necessarily be, more accurate than a neural network trained with a smaller amount of data in otherwise identical conditions. The computational expense and the time consumed in training a neural network is a factor not only of the size of the training data but also the size of the neural network. A typical neural network can include tens of thousands of nodes in hundreds of layers, tuning which consumes significant time and computational resources.

Different models are trained on different subject-matter domains. A subject-matter domain is represented as an ontology. An ontology, as used herein, is an organization of information pertaining to a subject-matter domain. Stated another way, concepts present in a subject-matter domain are organized relative to one another in a suitable arrangement to express the relationships between those concepts. A hierarchy, a nodes-and-edges graph, and containerization are some non-limiting way of organizing an ontology.

Within an ontology, a concept can be expressed in words in a language. A concept can be expressed in more than one ways, using more than one words, using different words or phrases, or some combination thereof. An ontology may pertain to an entire subject-matter domain or a portion thereof, and in one or more languages.

SUMMARY

The illustrative embodiments provide a method, system, and computer program product. An embodiment causes an autonomic function to execute using a processor and a memory in an artificial intelligence environment to detect a new problem space. the embodiment selects, using the autonomic function, a first model, wherein the first model comprises a first trained neural network corresponding to a first ontology. The embodiment identifies, using the autonomic function, a second model, wherein the second model comprises a second trained neural network corresponding to a second ontology. The embodiment extracts, using the autonomic function, a layer from the second model. The embodiment inserts, using the autonomic function, the layer into a location in the first model. The embodiment constructs, using the autonomic function, a vector transformation, wherein the vector transformation transforms an output vector of a previous layer in an immediately previous location in the model relative to the location. The embodiment fuse, using the autonomic function, the layer in the first model using the transformed output vector as input to the layer, the fusing forming a fused model that is operable on an ontology of the new problem space.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
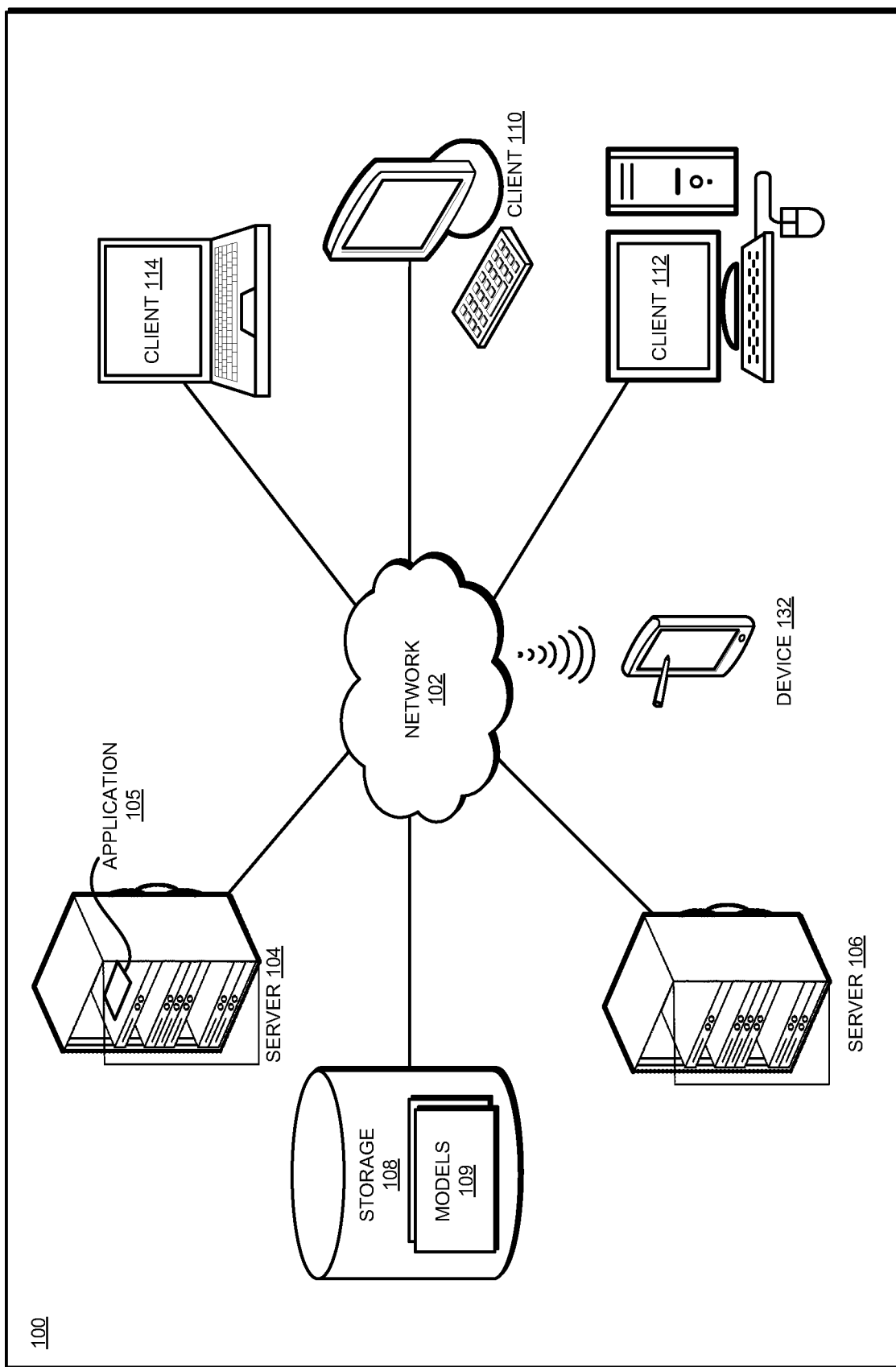
FIG. 1 depicts a block diagram of a network of data processing systems in which illustrative embodiments may be implemented.

Neural networks and their training are a well-recognized technological field of endeavor. The present state of the technology in this field of endeavor has certain drawbacks and limitations. The operations and/or configurations of the illustrative embodiments impart additional or new capabilities to improve the existing technology in this technological field of endeavor, especially in the area of autonomic training of neural networks.

The illustrative embodiments recognize that problem spaces to which neural network-based artificial intelligence (AI) can be applied are ever expanding and ever evolving. New problems need to be solved in existing data, new data needs to be analyzed for new information, previously unrecognized or unavailable subject-matter can become recognized or available for analysis, or combinations of these and other situations can give rise to a need for expanding the scope of the subject-matter on which a model can operate with an acceptable level of competency.

Presently, to configure a neural network for a new problem space, the neural network has to be trained on the input data pertaining to that problem space. If the problem space is expanding, a model for that problem space has to be retrained using input data from the expanded scope of the problem space. An expansion of an existing problem space that is known to a model, and a problem space that is previously unknown to the model, are collectively referred to herein as a "new" problem space unless expressly distinguished where used.

The illustrative embodiments recognize that this manner of training neural networks on new problem spaces requires at least some amount of expert involvement or supervision, whether for curating the subject-matter, or for preparing the input data, or for administrating the training, or some combination thereof. While unsupervised machine learning capabilities also exist today, the illustrative embodiments recognize that even the unsupervised machine learning also has to be pre-contemplated, pre-planned, and pre-configured in the form of a feedback circuit into the model, by the involvement of human experts. Furthermore, unsupervised learning, even if configured in this manner, is largely limited to improving the accuracy of existing trained model on known or configured problems in the subject-matter domain for which the model is already trained.

The term "autonomic" refers to unconscious actions or acts of an entity by its own volition under a given circumstance, without requiring a pre-configuration of that entity for responding to that circumstance, and without requiring preplanning of that action or that circumstance. Accordingly, autonomic learning refers to an unsupervised method of learning which is unconscious, unplanned, and occurring spontaneously as and when a learning opportunity presents itself. Autonomic learning in neural network-based AI therefore refers to a capability of a trained model to recognize a new problem space, seek out an appropriate method of expanding the model's own capabilities for operating in the knowledge gap that is represented by the new problem space, and become capable at least to an acceptable degree of competence in that new problem space.

The illustrative embodiments recognize that in many cases a new problem space presents data pertaining to subject-matter whose knowledge does not exist in the model's ontology. For such cases, there presently does not exist an autonomic methodology for expanding the capabilities of an already trained model to cover such knowledge gap.

The illustrative embodiments further recognize that in cases where the new problem space presents data pertaining to subject-matter whose knowledge does not exist in a model's ontology, the model, even if ultimately trained on the knowledge gap, exhibits only marginally acceptable accuracy relative to the accuracy in the original problem space. For such cases, there presently does not exist an autonomic methodology for improving the accuracy of a model that is trained and operational in the new problem space.

The illustrative embodiments further recognize that because new problem spaces come into existence constantly, a model should be able to autonomically learn how to operate in whatever new problem space is presented to the model next. The illustrative embodiments recognize that a need exists for autonomically expanding the capabilities of models over new problem spaces in a recursive manner. The illustrative embodiments further recognize that a need exists for autonomically improving the accuracy of models over new problem spaces, also in a recursive manner. The present state of the technological field of endeavor of neural network training does not include a mechanism, other than supervised learning and preconfigured unsupervised learning within an original problem space of a model, to continuously and autonomically expand the ability of a model to operate in new problem spaces.

The illustrative embodiments recognize that the presently available tools or solutions do not address these needs/problems or provide adequate solutions for these needs/problems. The illustrative embodiments used to describe the invention generally address and solve the above-described problems and other related problems by autonomic horizontal exploration in neural networks transfer learning.

An embodiment can be implemented as a combination of certain hardware components and a software application. An implementation of an embodiment, or one or more components thereof, can be configured as a modification of an existing neural network training system, with a companion software application executing in some combination of (i) the neural network training system itself, (ii) a data processing system communicating with the neural network training system over short-range radio or a local area network (LAN), and (iii) a data processing system communicating with the neural network training system over a wide area network (WAN).

An embodiment operates in conjunction with a model, and the combination of the model and the embodiment are compactly referred to herein as an improved model. The model that is improved by an embodiment is interchangeably referred to herein as a "first model" or an "original model".

One embodiment enables the improved model to perform a horizontal exploration operation, referred to as a head recursion. Horizontal exploration refers to an attempt to expand the subject-matter scope of an original problem space of an original model to a new subject-matter scope which includes the original problem space and the new problem space. The horizontal exploration eventually results in horizontal expansion of the improved model. A horizontally expanded improved model operates with at least a threshold level of accuracy over the original problem space and the new problem space. In other words, horizontal expansion of an improved model increases the ontology available to the horizontally expanded improved model to include the knowledge gap between the original ontology of the original model and the new ontology of the new problem space.

A repository of a plurality of models trained on different problem spaces is available to the illustrative embodiments. An embodiment recognizes that a new problem space has been presented in some fashion. For example, the embodiment may receive a request to describe a new circumstance, analyze data pertaining to a new situation, answer a question about a new subject, or otherwise derive information pertaining to a matter not present in the ontology of any model in the repository.

To perform a horizontal exploration, an embodiment selects from the repository an original model whose problem space most closely resembles the new problem space. one non-limiting example manner of performing this selection is to compare the new ontology corresponding to the new problem space with an ontology of a model in the repository and to select that model whose original ontology is least different (or different by less than a threshold difference metric) from the new ontology. The difference between the original ontology and the new ontology.

The embodiment selects a second model from the repository. The embodiment selects the second model such that the ontology of the second model (referred to as second original ontology) is most similar (or similar by greater than a threshold similarity metric) to the gap ontology. One non-limiting example method of selecting the second model includes selecting that second model whose second original ontology exhibits at least one of the following properties—(i) the second original ontology has a branching structure that is similar to the branching structure of the gap ontology, (ii) the second original ontology has at least a threshold number of nodes that are also present in the gap ontology, (iii) the second original ontology has at least a threshold number of nodes whose equivalents are also present in the gap ontology, (iv) the second original ontology pertains to a subject-matter of the gap ontology, (v) the subject-matter of the second original ontology is related to the subject-matter of the gap ontology according to a genre, classification, quality, field of study, environment of the subject matter, or some other relationship.

Different layers of a model essentially operate to extract features or feature primitives from the input they receive. For example, the shallowest layer of a model is the layer that receives the input vector formed from the input data of the problem space. A layer at intermediate depth in the model receives the output vector of the immediately previous layer as an input vector—with or without any intervening vector transformations. Progressively deeper layers in the model generally extract progressively richer, or more defined features. The penultimate layer, i.e., the second last deepest layer of the model produces an output vector in which the features from the problem space input data are most well defined. The deepest layer of the model is the output layer.

During head recursion, an embodiment searches for one or more layers in the second model that can be used to process the new problem space inputs, particularly for features relating to the gap ontology. The embodiment selects an intermediate layer that is neither the input layer nor the output layer from the second model. For the ease of reference, this selected intermediate layer is called layer x. In one non-limiting example, layer x is the penultimate layer of the second model.

The embodiment positions, inserts, or splices in, layer x from the second model at an intermediate location in the original model. For the ease of reference, the selected intermediate location of insertion is called location y. In one nonlimiting embodiment, location y in the original model is the same location which the selected layer occupied in the second model.

Layer x is configured to receive and operate on an input vector Ix in the second model, which is the output vector $O_{x-1}$ from the immediately preceding layer in the second model. At location y in the original model, the input vector Iy is the output vector $O_{y-1}$ from the immediately preceding layer in the original model. In order for layer x to be able to operate on Iy when inserted in the original model, an embodiment applies a transformation to $O_{y-1}$, the transformation producing a vector that is structurally similar to Ix in the second model. For example, the transformation function in one non-limiting example normalizes the length of the input vector, the size of inputs, the values of the inputs, or performs some combination of these and other transformations. One non-limiting example of a transformation function that can be utilized for this purpose is Gibbs sampling.

Similarly, layer x is configured to produce output vector Ox in the second model. However, when inserted in location y in the original model, layer y+1 in the original model expects an input vector Iy+1 according to the original model. In a manner described herein, an embodiment applies a vector transformation function to the output vector Oy produced by layer x in location y. The vector transformation on Oy produces an input vector that is structurally similar to the input vector Iy+1 that is expected by the next layer in the original model. For example, the transformation function in one non-limiting example normalizes the length of the input vector, the size of inputs, the values of the inputs, or performs some combination of these and other transformations. Again, Gibbs sampling is one non-limiting example method that can be used to perform this vector transformation.

An embodiment processes the new problem space input data through the fused model that is produced in this manner. If the fused model produces an output that satisfies a halting condition, the embodiment produces the fused model as the new model for the new problem space. If the fused model does not satisfy the halting condition, the embodiment recursively goes through the layer x selection, location y selection, splicing in, input vector transformation operations to determine a combination and positioning of the layers in the fused model that satisfies the halting condition. One non-limiting example of the halting condition is that the fused model achieves a threshold level of accuracy in the new problem space.

The head recursion is described with respect to a single layer—layer x—that is spliced in at a single location—location y—only as a non-limiting example. These example number of layers and locations are not intended to be limiting. From this disclosure, those of ordinary skill in the art will be able to conceive many other numbers of layers and locations of splicing in, and the same are contemplated within the scope of the illustrative embodiments. For example, a subset of layers from the second model can be extracted and spliced in into the original model. Furthermore, the subset of layers can be spliced in together at location y or different layers from the subset can be distributed in different locations in the original model without departing the scope of the illustrative embodiments.

Another embodiment enables a fused model to perform a vertical deepening operation, referred to as a tail recursion. Vertical deepening refers to an attempt to increase the accuracy of the fused model in the new problem space. The vertical deepening eventually results in deep fused model. A deep fused model operates with at least a second threshold level of accuracy over the new problem space. the second threshold level of accuracy is higher than the threshold level of accuracy described herein. In other words, vertical deepening of a fused model increases the accuracy of the fused model in the new problem space.

In an iteration of vertical deepening, an embodiment clones a layer of the second model that is spliced into the original model as described herein. In other words, an iteration of vertical deepening clones layer x that is spliced in at location y in the fused model. A clone of layer x is referred to as layer xa. One embodiment positions layer xa adjacent to layer x, e.g., in location y−1 or y+1. Another embodiment positions layer xa at location z, which is separated from layer x at location y be one or more intervening layers, e.g., in location y−a or y+a.

An embodiment processes the new problem space input data through the deepened fused model that is produced in this manner. If the deepened fused model produces an output that satisfies an accuracy-related halting condition, the embodiment produces the deepened fused model as the new model for the new problem space. If the deepened fused model does not satisfy the accuracy-related halting condition, the embodiment recursively goes through the vertical deepening operations to determine a combination and positioning of the layers in the deepened fused model that satisfies the accuracy-related halting condition. One non-limiting example of the accuracy-related halting condition is that the deepened fused model achieves the second threshold level of accuracy in the new problem space.

The manner of autonomic horizontal exploration in neural networks transfer learning described herein is unavailable in the presently available methods in the technological field of endeavor pertaining to neural network training. A method of an embodiment described herein, when implemented to execute on a device or data processing system, comprises substantial advancement of the functionality of that device or data processing system in enabling a neural network to autonomically explore and expand its knowledge to operate in a new problem space, improve its own accuracy in the newly expanded problem space, or both.

The illustrative embodiments are described with respect to certain types of neural network configurations, layers, locations of layers, numbers of layers, input/output vectors, transformations, thresholds, metrics, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
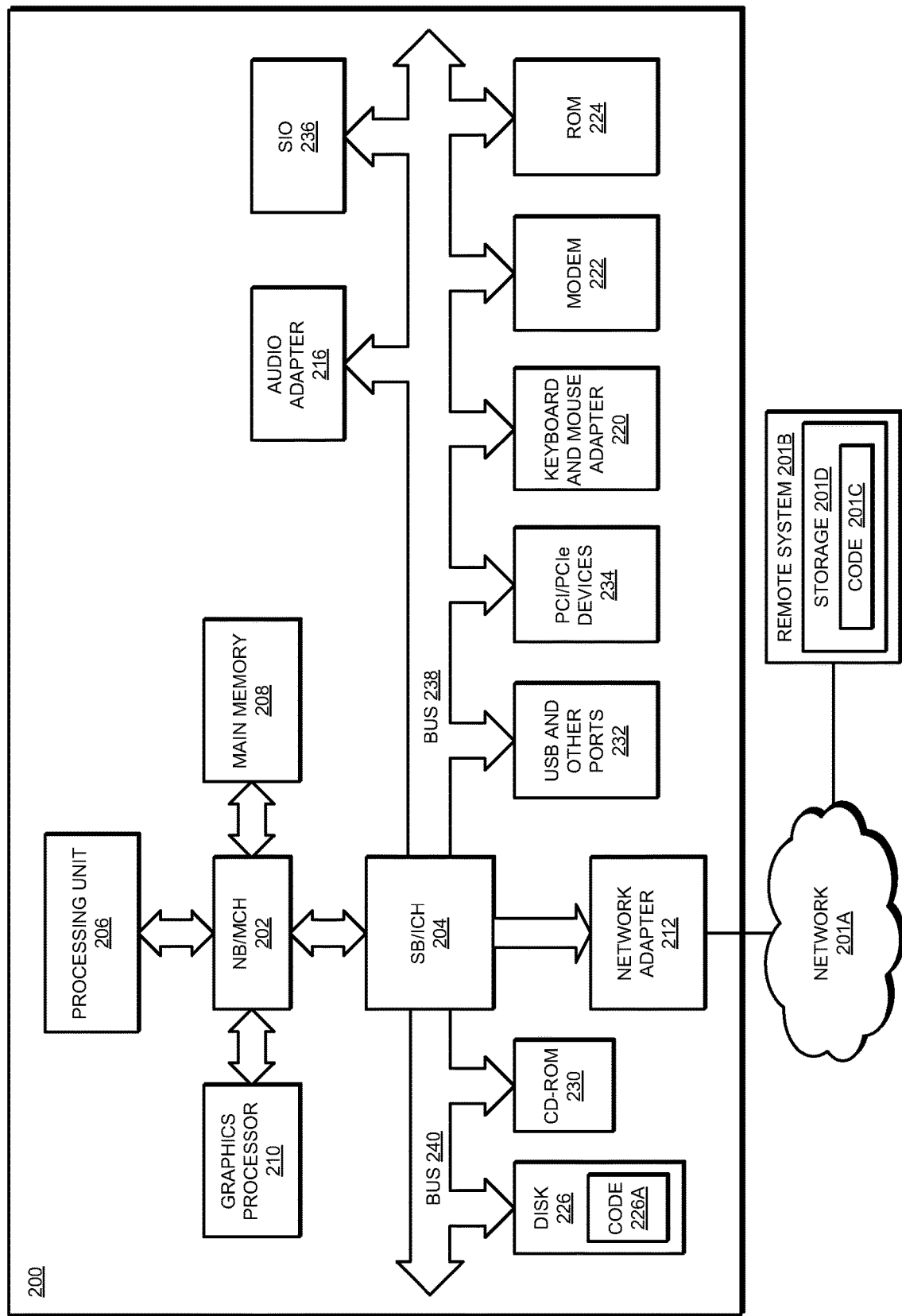
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 operates in conjunction with a model 109 selected from repository 108 to form an improved model as described herein. Specifically, application 105 splices layers from another model 109 into the first model 109 in a head recursion operation to form a fused model as described herein. Application 105, separately or in combination with the head recursion operation, performs a tail recursion operation on a fused model to form a deep fused model as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3A:
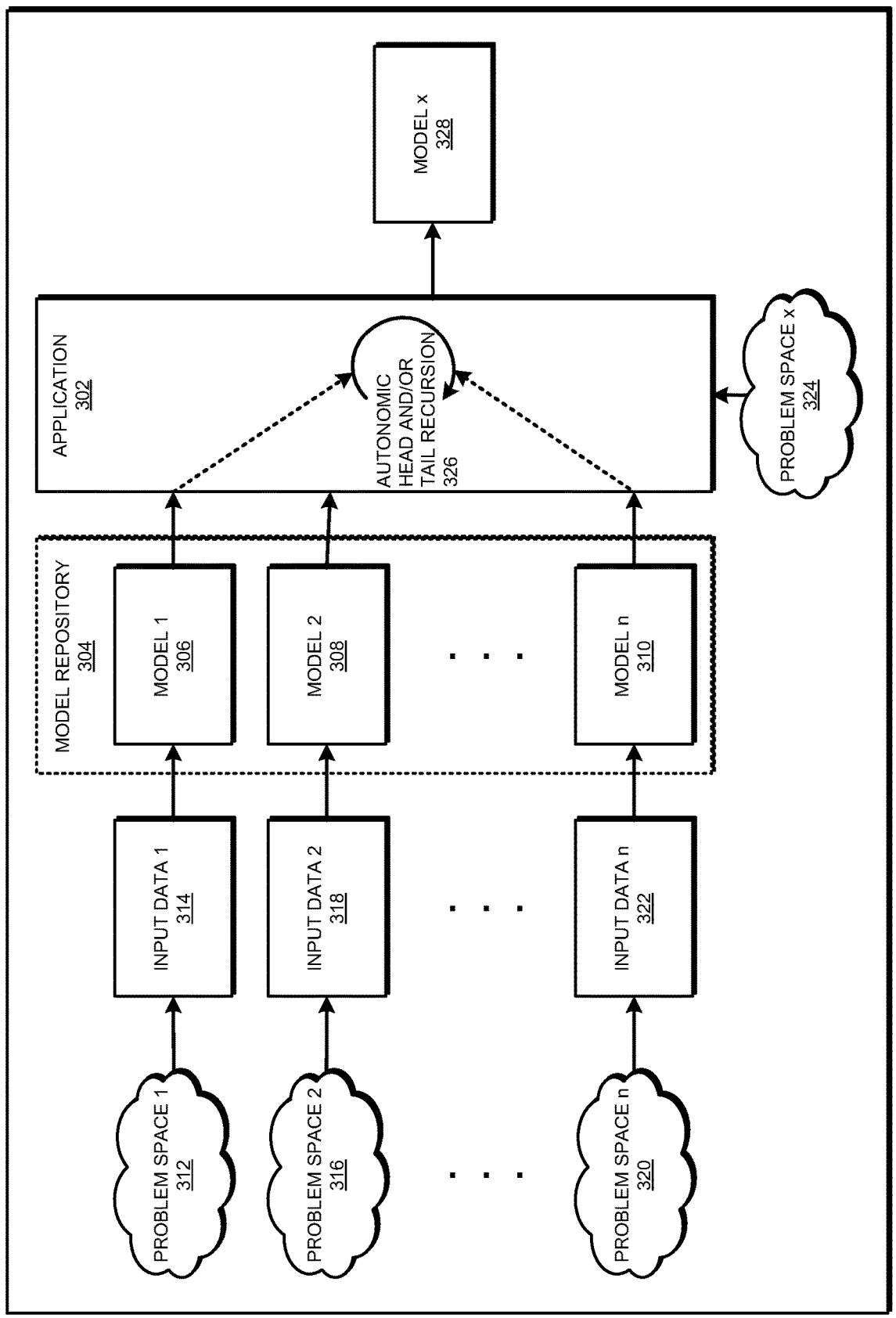
FIG. 3A depicts a block diagram of an example configuration for autonomic horizontal exploration in neural networks transfer learning in accordance with an illustrative embodiment.

With reference to FIG. 3A, this figure depicts a block diagram of an example configuration for autonomic horizontal exploration in neural networks transfer learning in accordance with an illustrative embodiment. Application 302 is an example of application 105 in FIG. 1. Model repository 304 is similar to repository 108 in FIG. 1. Models model 1 (306), model 2 (308), and model n (310) are some examples of models 109 in FIG. 1.

Assume that problem space 1 (312) produces input data 1 (314), and model 1 (306) is trained to operate on problems relating to problem space 1. Similarly, problem space 2 (316) produces input data 2 (318), and model 2 (308) is trained to operate on problems relating to problem space 2, and so on until problem space n (320) produces input data n (322), and model n (310) is trained to operate on problems relating to problem space n.

Application 302 detects problem space x (324). Application 302 autonomically performs a head recursion operation, a tail recursion operation, or both (collectively, 326) in a manner described herein to produce model x (328). Model x may be a fused model or a deep fused model, as the case may be. For example, in operation 326, application 302 selects model 1 as the original model, and model n as the second model. In an autonomic head recursion in operation 326, application 302 fuses or splices in one or more layers from model n in one or more locations in model 1 to produce a fused model x. When an improvement in the accuracy over the gap between problem space 1 and problem space x is needed, an autonomic tail recursion in operation 326 vertically deepens the fused model x to produce a deep fused model x.

Figure 3B:
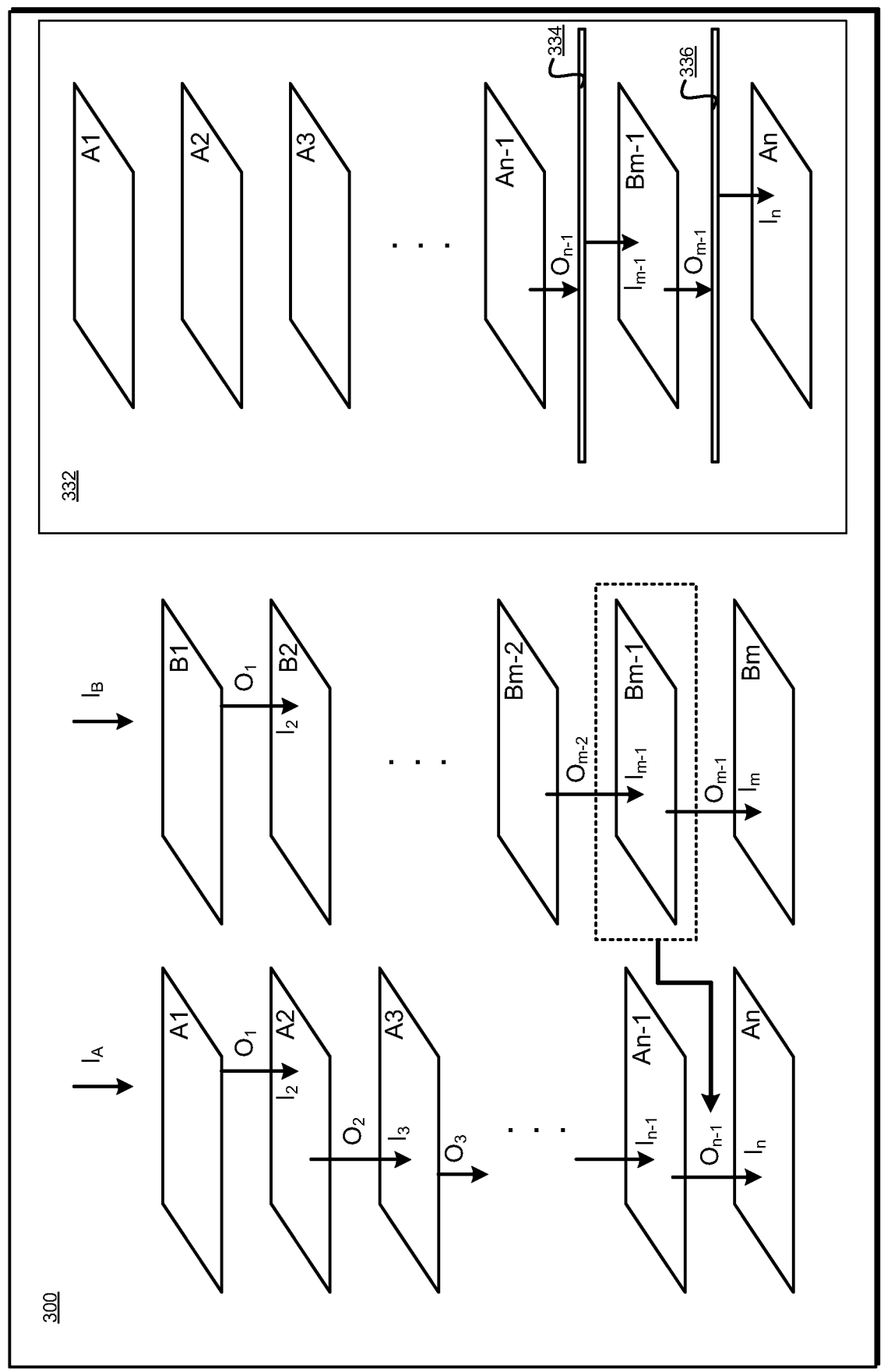
FIG. 3B depicts a block diagram of an example head recursion operation in accordance with an illustrative embodiment.

With reference to FIG. 3B, this figure depicts a block diagram of an example head recursion operation in accordance with an illustrative embodiment. Operation 326 in application 302 of FIG. 3A can be configured to perform head recursion operation 300 depicted in this figure.

Suppose that original model—model A, includes n layers, namely, layers $A_1, A_2, A_3 \ldots A_n$. Input vector $I_A$ comprises input data from problem space A (not shown) on which model A is trained. Layer $A_1$ accepts input vector $I_A$ and outputs output vector $O_1$. Only for the clarity of the description without unnecessary details, assume that $O_1$ forms the input vector $I_2$ for layer $A_2$. Output of $A_2$ is $O_2$, which becomes input $I_3$ of $A_3$; $A_3$ produces output vector $O_3 \ldots$ Penultimate layer $A_{n-1}$ receives input vector $I_{n-1}$ and outputs vector $O_{n-1}$; and final layer $A_n$ accepts $O_{n-1}$ as input vector $I_n$ to produce output vector $O_n$.

In a similar manner, a second model—model B, includes n layers, namely, layers $B_1, B_2, B_3 \ldots B_n$. Input vector $I_B$ comprises input data from problem space B (not shown) on which model B is trained. Layer $B_1$ accepts input vector $I_B$ and outputs output vector $O_1$. Only for the clarity of the description without unnecessary details, assume that $O_1$ forms the input vector $I_2$ for layer $B_2$. Output of $B_2$ is $O_2 \ldots$ Output of $B_{m-2}$ is $O_{m-2} \ldots$ Penultimate layer $B_{m-1}$ receives input vector $I_{m-1}$ and outputs vector $O_{m-1}$; and final layer $B_m$ accepts $O_{m-1}$ as input vector $I_m$ to produce output vector $O_m$.

In a non-limiting example head recursion operation, application 302 selects penultimate layer $B_{m-1}$ from model B for splicing into model A. In the example head recursion, application 302 selects to splice layer $B_{m-1}$ in model A such that layer $B_{m-1}$ becomes the penultimate layer in the fused model. I.e., application 302 inserts layer $B_{m-1}$ at location n−1 in model A.

Configuration 332 depicts a fused model. Application 302 applies vector transformation function 334 to transform output vector $O_{n-1}$ from layer $A_{n-1}$ of original model A into input vector $I_{m-1}$ as expected by layer $B_{m-1}$. Application 302 applies vector transformation function 336 to transform output vector $O_{m-1}$ of layer $B_{m-1}$ into input vector $I_{n-1}$ as expected by layer $A_n$ of original model A.

Figure 3C:
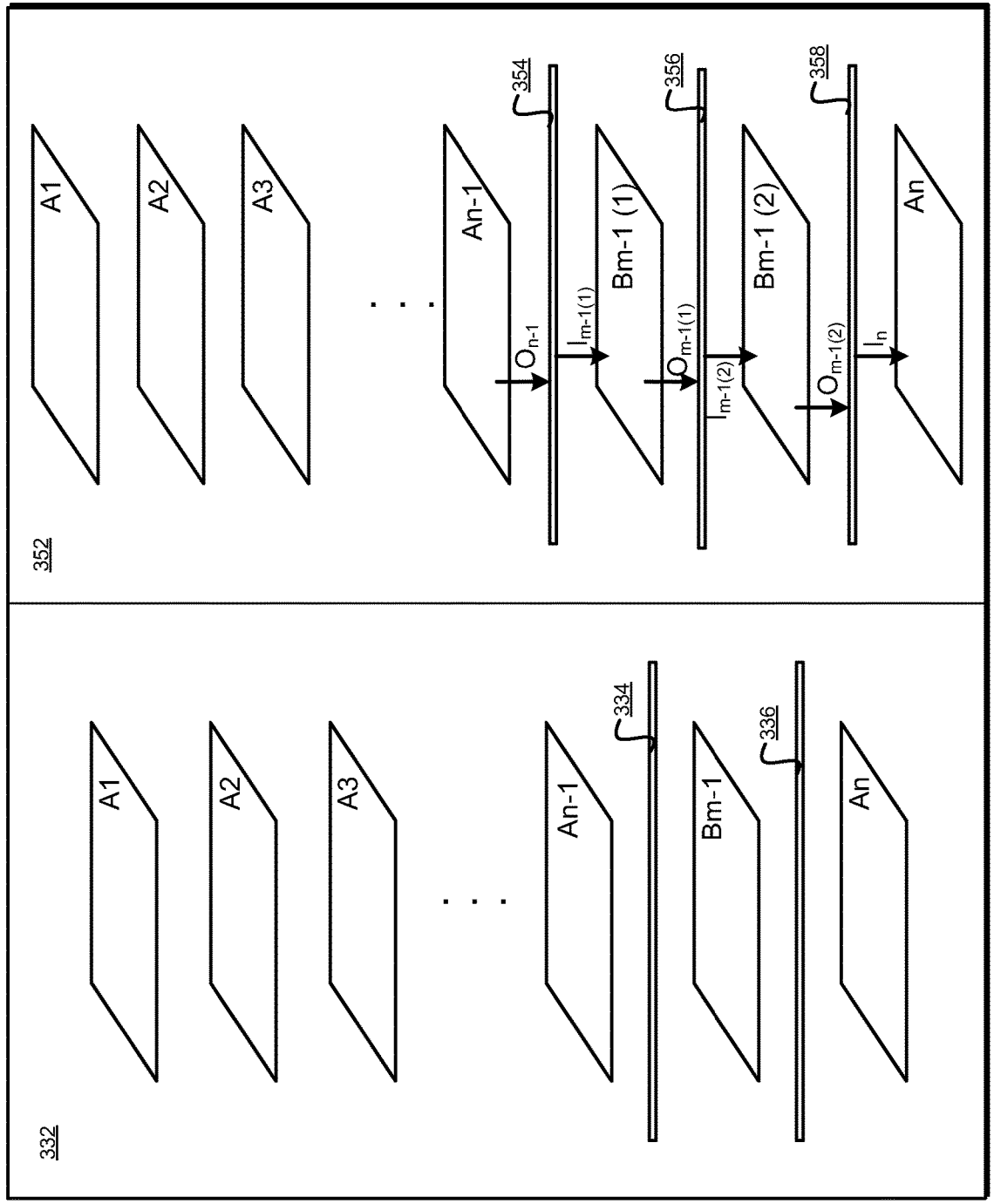
FIG. 3C depicts a block diagram of an example tail recursion operation in accordance with an illustrative embodiment.

With reference to FIG. 3C, this figure depicts a block diagram of an example tail recursion operation in accordance with an illustrative embodiment. Operation 326 in application 302 of FIG. 3A can be configured to perform the tail recursion operation depicted in this figure.

Fused model configuration 332 is the same as in FIG. 3B and is reused only for the clarity of the description and not to imply any limitation on the illustrative embodiments. Application 302 performs a tail recursion operation by cloning spliced in layer $B_{m-1}$ in fused model 332 and positioning the clones of the spliced in layer ($B_{m-1(1)}$ and $B_{m-1(2)}$) within the fused model 332 to form deep fused model 352. Only as a non-limiting example, cloned layers $B_{m-1(1)}$ and $B_{m-1(2)}$ are depicted positioned adjacent to one another in location n−1.

Application 302 applies vector transformation function 354 to transform output vector $O_{n-1}$ from layer $A_{n-1}$ of original model A into input vector $I_{m-1(1)}$ as expected by layer $B_{m-1(1)}$. Application 302 applies vector transformation function 356 to transform output vector $O_{m-1(1)}$ of layer $B_{m-1(1)}$ into input vector $I_{m-1(2)}$ as expected by layer $B_{m-1(2)}$. Application 302 applies vector transformation function 358 to transform output vector $O_{m-1(2)}$ of layer $B_{m-1(2)}$ into input vector $I_{n-1}$ as expected by layer $A_n$ of original model A.

Figure 4:
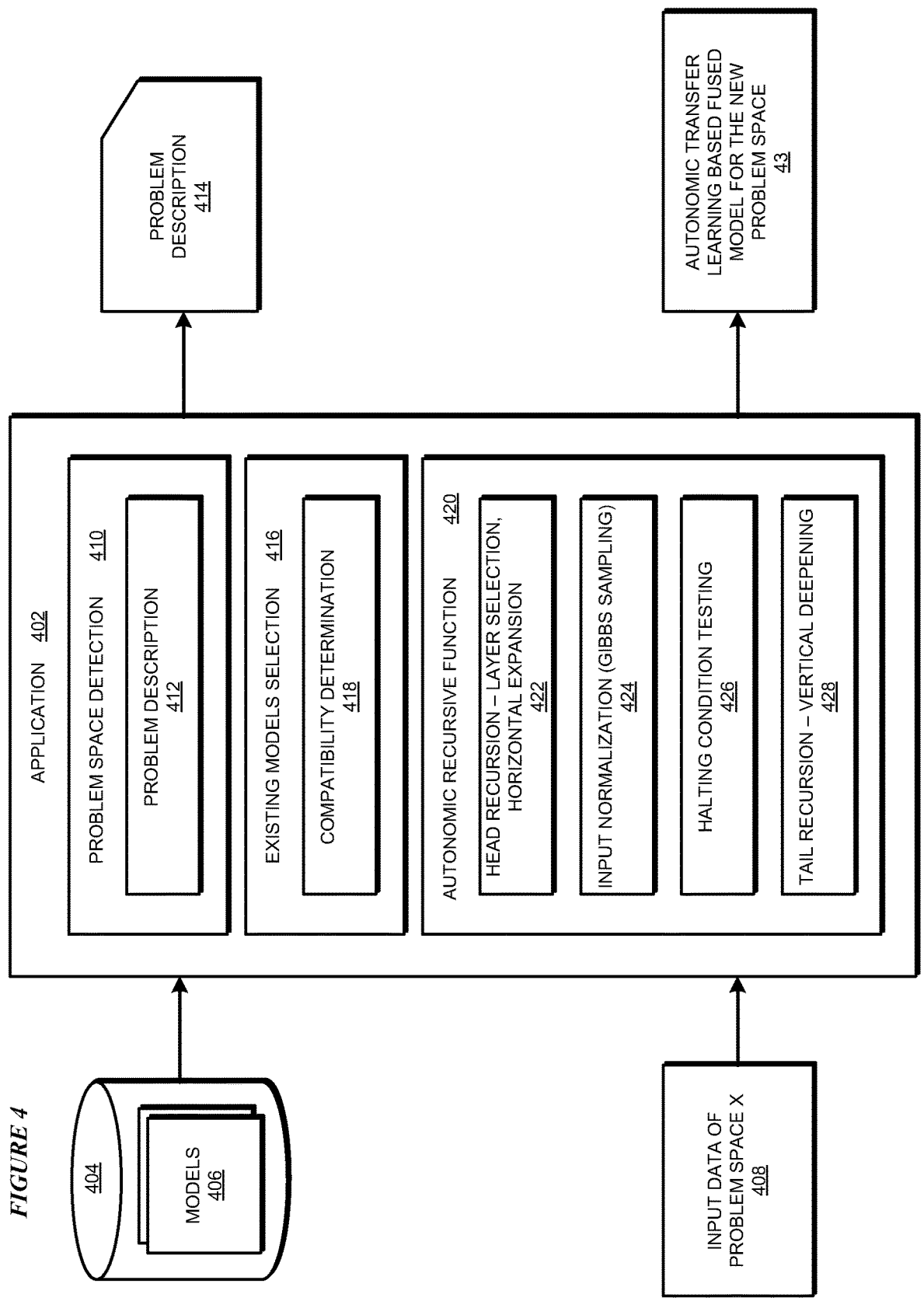
FIG. 4 depicts a block diagram of an example configuration of an application for autonomic horizontal exploration in neural networks transfer learning in accordance with an illustrative embodiment.

With reference to FIG. 4, this figure depicts a block diagram of an example configuration of an application for autonomic horizontal exploration in neural networks transfer learning in accordance with an illustrative embodiment. Application 402 is an example of application 302 in FIG. 3. Repository 404 is an example of model repository 108 in FIG. 1, and provides pretrained models 406 in the manner of models 109 in FIG. 1.

Input data 408 corresponds to a new problem space as described herein. Component 410 detects the new problem space corresponding to input data 408. Optionally, subcomponent 412 composes problem description 414 corresponding to the new problem space of input data 408. In one embodiment, problem description 414 is in natural language text and is produced using a natural language processing engine with a known technique.

Component 416 selects the original model and a second models from models 406 in a manner described herein. Specifically, subcomponent 418 selects the second model from models 406 by determining a compatibility of a selected model 406 with the knowledge gap as described herein. In one embodiment, subcomponent 418 also determines a level of the compatibility using which component 416 selects the most suitable second model.

Component 420 performs an autonomic recursive learning operation in a manner described herein. For example, subcomponent 422 performs a head recursion operation, including layer selection and splicing in, to accomplish horizontal expansion. Subcomponent 424 configures appropriate vector transformation functions, e.g., but not limited to Gibbs sampling, for the splicing in of one or more layers from the second model into the original model as described herein. Subcomponent 426 tests for the halting condition to determine when the fused model resulting from the head recursion operation is acceptable. An acceptable fused model is output from application 402 as autonomic transfer learning based fused model 430 for the new problem space.

Subcomponent 428 performs tail recursion operation, including cloning, to improve the accuracy of the fused model 430. The vertical deepening from the tail recursion results in a deep fused model, which could be output as model 430 when tail recursion of subcomponent 428 is also used. In such a case, deep fused model 430 would have a better accuracy than fused model 430 produced without the vertical deepening.

Figure 5:
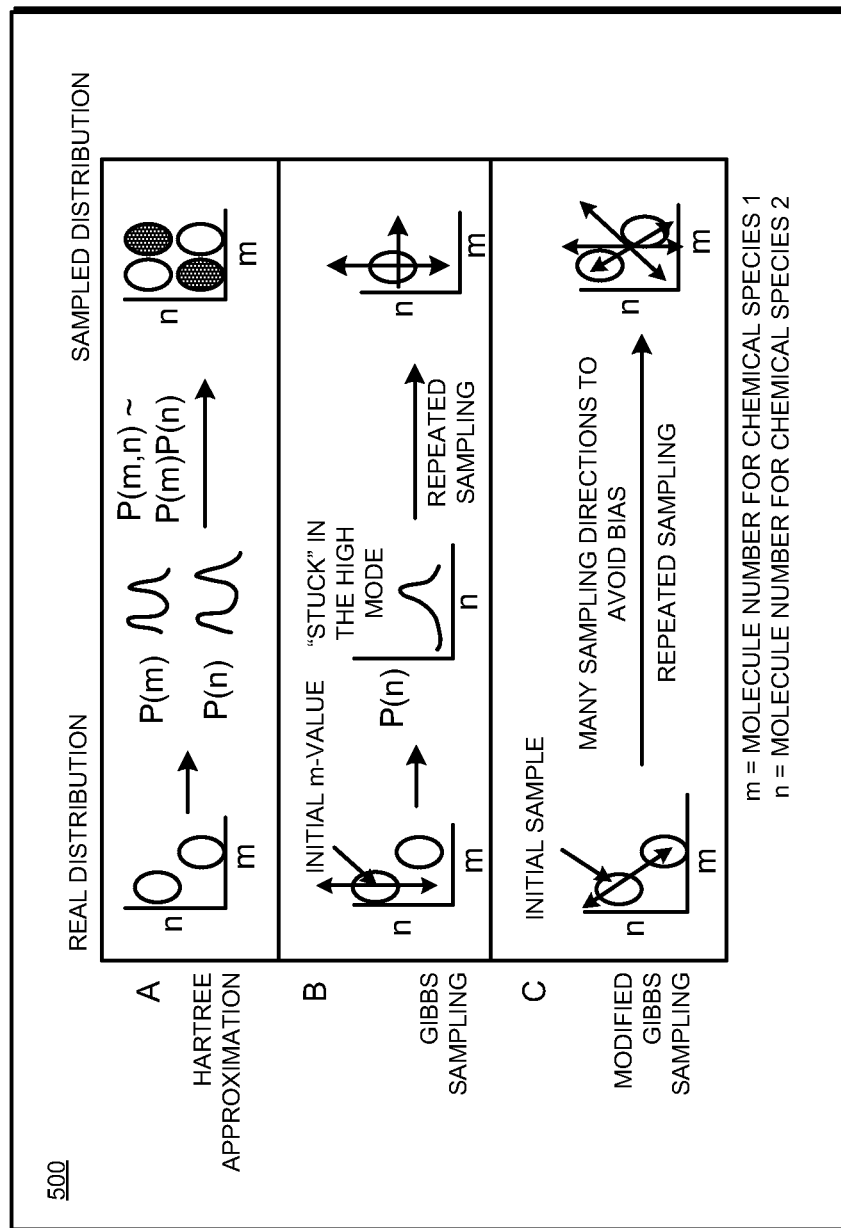
FIG. 5 depicts an example operation of the sampling in a conceptual space to replicate the initial clusters in accordance with an illustrative embodiment.

In an example implementation, the autonomic recursive learning operation of application 402 proceeds using Gibbs sampling as follows—
1. We begin with some initial value $X^{(i)}$
2. We want the next sample.
   a. Call this next sample $X^{(i+1)}$
3. Since $X^{(i+1)} = (x_1^{(i+1)}, x_2^{(i+1)}, \ldots, x_n^{(i+1)})$ is a vector, we sample each component of the vector $x_j^{(i+1)}$ from the distribution of that component conditioned on all other components sampled so far.
   a. We specify the pseudo-code interpretation of this equation as $X\hat{}((i+1)) = (x\_1\hat{}((i+1)), x\_2\hat{}((i+1)), \ldots, x\_n\hat{}((i+1)))$.
4. The system will condition on the $X^{(i+1)}$ component up to $x_{j-1}^{(i+1)}$.
   a. The system will then condition on the $X^{(i)}$ component, starting from $x_{j+1}^{(i)}$ to $x_n^{(i)}$.
5. In order to achieve the sequence described, the system will sample the components in order, starting from the first component.
   a. This implies that when the system samples $x_j^{(i+1)}$ it will update the values based on the distributioned specified by $p(x_j^{(i+1)} | x_1^{(i+1)}, \ldots, x_{j-1}^{(i+1)}, x_{j+1}^{(i)}, \ldots, x_n^{(i)})$.
   b. We specify the pseudo-code interpretation of this equation as $p(x\_j\hat{}((i+1))-1 | x\_1\hat{}((i+1)), \ldots, x\_(j-1)\hat{}((i+1)), x\_(j+1)\hat{}((i)), \ldots, x\_n\hat{}((i)))$ for easier implementation
6. Steps 2-5 are repeated according to parameter k times Gibbs sampling works in a generalized problem in the above described manner. For neural networks, the illustrative embodiments use this approach to learn the activation functions that will reproduce the original input in the model. Graph 500 in FIG. 5 depicts an example operation of the sampling in a conceptual space to replicate the initial clusters in accordance with an illustrative embodiment.

Figure 6:
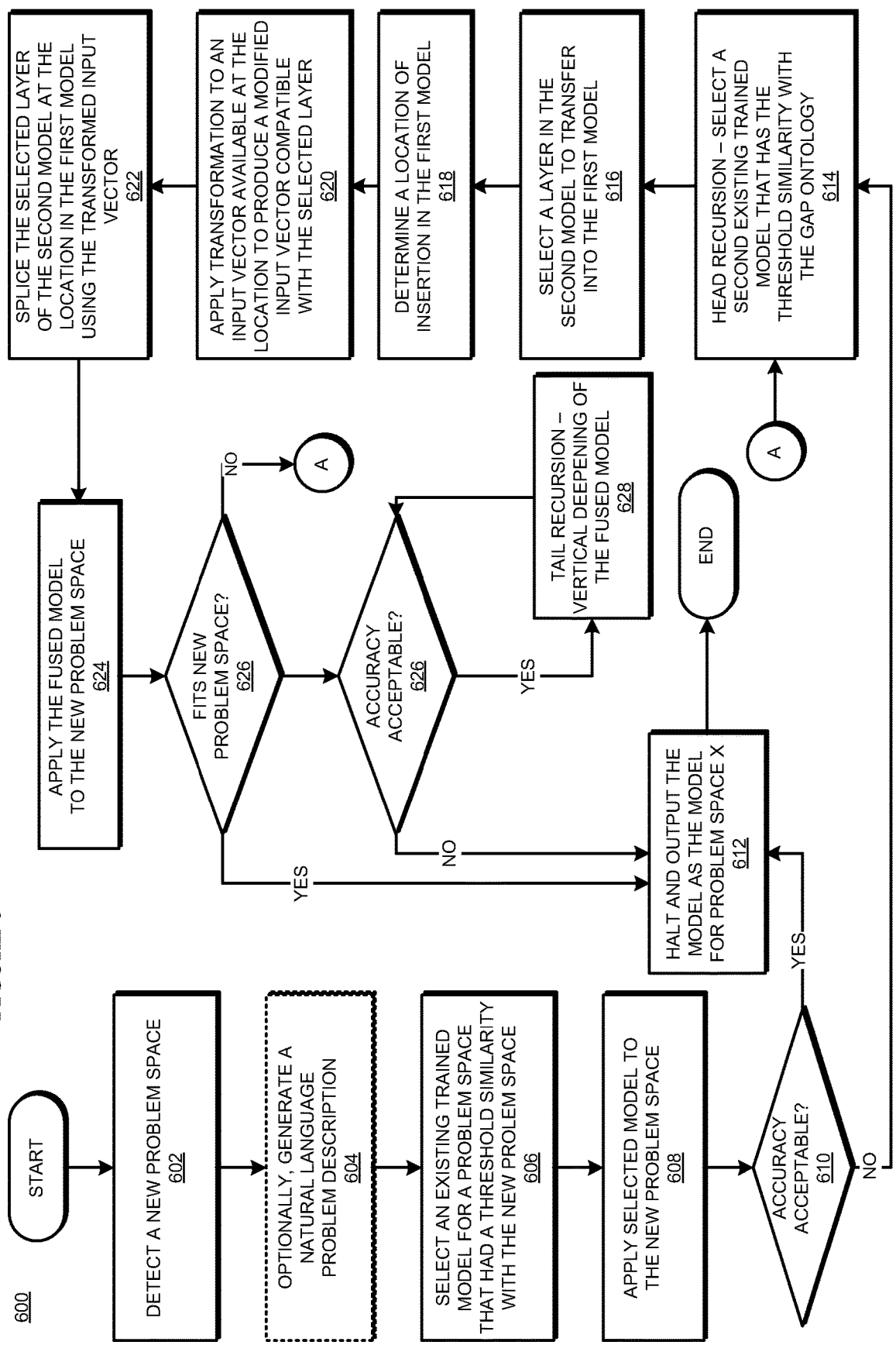
FIG. 6 depicts a flow chart of an example process for autonomic horizontal exploration in neural networks transfer learning in accordance with an illustrative embodiment.

With reference to FIG. 6, this figure depicts a flow chart of an example process for autonomic horizontal exploration in neural networks transfer learning in accordance with an illustrative embodiment. Process 600 can be implemented using application 402 in FIG. 4.

The application detects a new problem space (block 602). The application optionally produces a problem description corresponding to the new problem space, e.g., in natural language as described herein (block 604).

The application selects an existing model (first model) which is trained for a problem space that has at least a threshold similarity with the new problem space (block 606). The application applies the first model to the new problem space, e.g., by processing input data corresponding to the new problem space using the first model (block 608). The application determines whether the accuracy achieved in the new problem space by the first model is acceptable (block 610). If the accuracy is acceptable ("Yes" path of block 610), the application halts further processing and outputs the first model as the model for the new problem space (block 612). The application ends process 600 thereafter.

If the accuracy is not acceptable ("No" path of block 610), the application performs a head recursion operation by selecting a second model whose ontology has at least a threshold similarity with the gap ontology (block 614). The application selects a layer from the second model to transfer into the first model (block 616). The application determines a location of insertion in the first model (block 618). The application applies a transformation to an input vector available at the location to produce an input vector expected by the selected layer (block 620). The application splices in the selected layer at the selected location using the transformed input vector to form a fused model as described herein (block 622).

The application applies the fused model to the new problem space (block 624). The application determines whether the fused model fits the new problem space (block 626). If the fused model does not fit the new problem space ("No" path of block 626), the application returns to block 614.

If the fused model fits the new problem space ("Yes" path of block 626), the application determines whether an accuracy of the fused model should be improved for the new problem space (block 628). If the accuracy of the fused model need not be improved ("No" path of block 628), the application proceeds to block 612 and ends process 600 thereafter.

If the accuracy of the fused model need has be improved ("Yes" path of block 628), the application performs a tail recursion operation for vertical deepening of the fused model (block 630). The application returns to block 628. Eventually, no further improvement in the accuracy will be needed and the application will proceed to block 612 and end process 600 thereafter.

Thus, a computer implemented method, system or apparatus, and computer program product are provided in the illustrative embodiments for autonomic horizontal exploration in neural networks transfer learning and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A method comprising: causing an autonomic function to execute using a processor and a memory in an artificial intelligence environment to detect a new problem space; selecting, using the autonomic function, a first model, wherein the first model comprises a first trained neural network corresponding to a first ontology; identifying, using the autonomic function, a second model, wherein the second model comprises a second trained neural network corresponding to a second ontology; extracting, using the autonomic function, a layer from the second model; inserting, using the autonomic function, the layer into a location in the first model; constructing, using the autonomic function, a vector transformation, wherein the vector transformation transforms an output vector of a previous layer in an immediately previous location in the first model relative to the location; and fusing, using the autonomic function, the layer in the first model using the transformed output vector as input to the layer, the fusing forming a fused model that is operable on an ontology of the new problem space.

2. The method of claim 1, further comprising:
selecting the location in the first model such that the layer at the location identifies a feature in a gap between a first ontology of the first model and an ontology of the new problem space.

3. The method of claim 1, further comprising:
selecting the layer from the second model based on an output feature set produced from the layer, wherein the output feature set comprises a feature that has a threshold similarity with a feature in the new problem space.

4. The method of claim 1, wherein the layer is a penultimate layer in the second model.

5. The method of claim 4, wherein the location is a position of the layer in the second model relative to a last layer in the second model.

6. The method of claim 1, wherein the second ontology has a threshold similarity with a gap between the first ontology and the ontology of the new problem space.

7. The method of claim 1, wherein the first ontology has a threshold similarity with the ontology of the new problem space.

8. The method of claim 1, further comprising:
receiving a new input data; determining, using the autonomic function, that the new input data requires an ontology that is unavailable in any trained model in a model repository.

9. The method of claim 1, further comprising:
constructing, using the autonomic function, a second vector transformation, wherein the second vector transformation transforms an output vector of the layer to produce an input vector for a next layer located immediately after the location.

10. A computer usable program product comprising one or more computer-readable storage medium, and program instructions collectively stored on the one or more computer-readable storage medium, the stored program instructions comprising: program instructions to cause an autonomic function to execute using a processor and a memory in an artificial intelligence environment to detect a new problem space; program instructions to select, using the autonomic function, a first model, wherein the first model comprises a first trained neural network corresponding to a first ontology; program instructions to identify, using the autonomic function, a second model, wherein the second model comprises a second trained neural network corresponding to a second ontology; program instructions to extract, using the autonomic function, a layer from the second model; program instructions to insert, using the autonomic function, the layer into a location in the first model; program instructions to construct, using the autonomic function, a vector transformation, wherein the vector transformation transforms an output vector of a previous layer in an immediately previous location in the first model relative to the location; and program instructions to fuse, using the autonomic function, the layer in the first model using the transformed output vector as input to the layer, the program instructions to fuse forming a fused model that is operable on an ontology of the new problem space.

11. The computer usable program product of claim 10, further comprising:
program instructions to select the location in the first model such that the layer at the location identifies a feature in a gap between a first ontology of the first model and an ontology of the new problem space.

12. The computer usable program product of claim 10, further comprising:
program instructions to select the layer from the second model based on an output feature set produced from the layer, wherein the output feature set comprises a feature that has a threshold similarity with a feature in the new problem space.

13. The computer usable program product of claim 10, wherein the layer is a penultimate layer in the second model.

14. The computer usable program product of claim 13, wherein the location is a position of the layer in the second model relative to a last layer in the second model.

15. The computer usable program product of claim 10, wherein the second ontology has a threshold similarity with a gap between the first ontology and the ontology of the new problem space.

16. The computer usable program product of claim 10, wherein the first ontology has a threshold similarity with the ontology of the new problem space.

17. The computer usable program product of claim 10, further comprising:
program instructions to receive a new input data; determining, using the autonomic function, that the new input data requires an ontology that is unavailable in any trained model in a model repository.

18. The computer usable program product of claim 10, wherein the stored program instructions are stored in a computer readable storage medium in a data processing system, and wherein the stored program instructions are transferred over a network from a remote data processing system.

19. The computer usable program product of claim 10, wherein the stored program instructions are stored in a computer readable storage medium in a server data processing system, and wherein the stored program instructions are downloaded over a network to a remote data processing system for use in a computer readable storage medium associated with the remote data processing system, further comprising:
program instructions to meter use of the computer usable code associated with the request; and
program instructions to generate an invoice based on the metered use.

20. A computer system comprising a processor, a computer-readable memory, and a computer-readable storage device, and program instructions stored on the storage device for execution by the processor via the memory, the stored program instructions comprising: program instructions to cause an autonomic function to execute using a processor and a memory in an artificial intelligence environment to detect a new problem space; program instructions to select, using the autonomic function, a first model, wherein the first model comprises a first trained neural network corresponding to a first ontology; program instructions to identify, using the autonomic function, a second model, wherein the second model comprises a second trained neural network corresponding to a second ontology; program instructions to extract, using the autonomic function, a layer from the second model; program instructions to insert, using the autonomic function, the layer into a location in the first model; program instructions to construct, using the autonomic function, a vector transformation, wherein the vector transformation transforms an output vector of a previous layer in an immediately previous location in the first model relative to the location; and program instructions to fuse, using the autonomic function, the layer in the first model using the transformed output vector as input to the layer, the program instructions to fuse forming a fused model that is operable on an ontology of the new problem space.

* * * * *